United States Patent [19]

Bienstman et al.

[11] Patent Number: 4,614,840

[45] Date of Patent: Sep. 30, 1986

[54] TELECOMMUNICATION LINE CIRCUIT AND ASSOCIATED POLARITY REVERSAL CIRCUIT

[75] Inventors: Luc A. Bienstman, Hofstade; Wlodimir J. Dobosch, Maas-Mechelen, both of Belgium

[73] Assignee: International Standard Electric Corporation, New York, N.Y.

[21] Appl. No.: 663,273

[22] Filed: Oct. 22, 1984

[30] Foreign Application Priority Data

Oct. 21, 1983 [BE] Belgium .................. 2/60231

[51] Int. Cl.⁴ ......................................... H04M 15/28
[52] U.S. Cl. .............................................. 179/7.1 R
[58] Field of Search .................. 179/7.1 R, 7 R, 8 R; 330/1 R

[56] References Cited

U.S. PATENT DOCUMENTS 4,063,037 12/1977 Heffernam et al. .............. 179/7.1 R Primary Examiner—Stafford D. Schreyer
Attorney, Agent, or Firm—John T. O'Halloran; Thomas F. Meagher

[57] ABSTRACT

The present invention relates to a telecommunication line circuit including at least one line amplifier whose output is coupled to a telecommunication line conductor, and DC biasing means associated with said amplifier to apply thereto a DC bias signal of such a value that said amplifier cannot saturate when an AC metering signal is applied to it.

11 Claims, 2 Drawing Figures

TELECOMMUNICATION LINE CIRCUIT AND ASSOCIATED POLARITY REVERSAL CIRCUIT

PRIOR ART

Such a telecommunication line circuit is already known from European patent application No. 81201204.5 (=0078347) (J. DANNEELS et al 7-1). To prevent the saturation of the line amplifier by the metering signal, during the transmission of such a signal the bias signal is given a constant value which is larger than the maximum amplitude of this metering signal. As a consequence a relatively considerable amount of power is unnecessarily dissipated in the amplifier during the time when the metering signal has an amplitude smaller than this maximum amplitude.

SUMMARY

An object of the present invention is to provide a telecommunication line circuit of the above type, but with reduced power dissipation of the amplifier during the transmission of a metering signal.

According to the invention this object is achieved due to the fact that said bias signal varies in function of said metering signal.

Another characteristic feature of the present telecommunication line circuit is that said bias signal varies with the envelope of said metering signal.

In this way the bias signal is not larger than strictly necessary to prevent saturation of the amplifier by the metering signal so that the power dissipation is reduced to a minimum.

The present invention also relates to a polarity reversal circuit for a telecommunication line circuit for reversing the polarity on at least one line conductor in a telecommunication line circuit, said polarity reversal circuit, including a differential amplifier with first and second intercoupled amplifier circuits having a common bias and having first and second inputs and first and second outputs, and a control signal source which when applying said control signal between said inputs gradually varies the current on at least said first output betweeen predetermined first and second values.

Such a polarity reversal circuit is already known from Belgian Pat. No. 893 931 (B.F. ORR 1). In this known circuit the outputs of the differential amplifier are connected to respective ones of the conductors of the telecommunication line and the circuit is adapted to perform a complementary polarity reversal simultaneously on both these conductors. Because the line current flows in the differential amplifier this time required to perform the polarity reversion time is directly dependent on the value of this current. Moreover this known polarity reversal circuit includes an additional differential amplifier.

Another object of the present invention is to provide a polarity reversal circuit of the above type, but which is of a simpler structure and is adapted to perform a polarity reversal on one line conductor only and in a time which is independent of the line current.

According to the invention this object is achieved due to the fact that said first output is connected on the one hand to a DC input voltage via a first resistance and on the other hand to an input of an operational amplifier, whilst said second output is connected to a DC supply voltage, and that said common bias is provided by a constant current source.

In this way and by means of only one differential amplifier the polarity at the first output may be reversed independently from the line current and on a constant time because a constant current flows through the amplifier.

The above mentioned and other objects and features of the invention will become more apparent and the invention itself will be best understood by referring to the following description of embodiments taken in conjunction with the accompanying drawings wherein:

DRAWING DESCRIPTION

DETAILED DESCRIPTION

Figure 1:
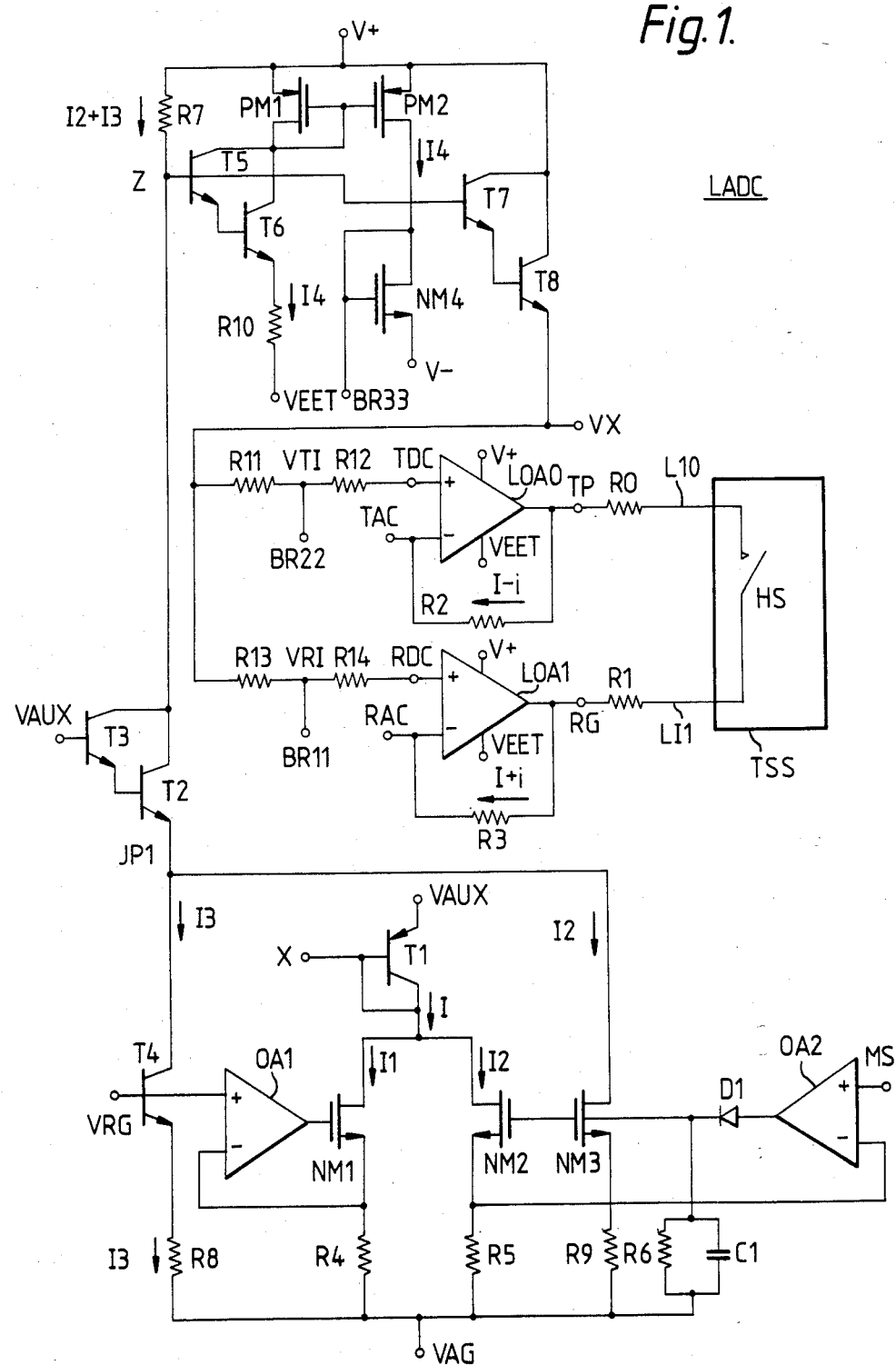
FIG. 1 represents a telecommunication line circuit according to the invention.

Principally referring to FIG. 1, the telecommunication line circuit or subscriber line interface circuit shown therein includes a line amplifier DC control circuit LADC adapted to apply suitable DC bias voltages to the non-inverting inputs TDC and RDC of operational line amplifiers LOA0 and LOA1. The subscriber line interface circuit itself forms part of a line circuit connected in a telecommunication exchange between a switching network (not shown) and one end of a telephone line with conductors LI0 and LI1. The other end of this line is connected to a subscriber subset TSS including a normally open hook switch HS. The tip and ring outputs TP and RG of the line amplifiers LOA0 and LOA1 are coupled, on the one hand, to the respective line conductors LI0 and LI1 via corresponding feed resistors R0 and R1 and, on the other hand, to their respective inverting inputs TAC and RAC through equal feedback resistors R2 and R3 of same value respectively.

LADC operates with the following supply voltages:

V+ which is at ground potential;

V− which is at −48 or −60 Volts;

VAUX which is an auxiliary voltage and is 15 Volts above V−;

VAG which is a voltage 7.5 Volts above V−;

VRG which is a reference voltage 2.4 Volts above VAG;

B1 which is a bias voltage provided by a constant current source such that when applied to a transistor a constant current flows therein;

VEET which is a regulated voltage, LOA0 and LOA1 being each fed between V+ and VEET.

As will be described hereinafter the control circuit LADC is able to apply a voltage $VH' = (V+) - 2\Delta V$ or $VL' = VEET$ to the non-inverting input of each line amplifier LOA0 or LOA1. As a consequence a voltage $VH = (V+) - \Delta V$ or $VL = VEET + \Delta V$ then appears at the output of this amplifier. Herein $\Delta V = (VRG - VAG) + (VE - VAG)$, wherein VRG and VAG are the above mentioned voltages and VE is the envelope of a metering signal MS. As described in the Belgian Pat. No. 898 052 (L. BIENSTMAN-E. WILLOCKX 6-1), this metering signal and also a speech signal are applied to the amplifiers in a balanced way by withdrawing currents $I-i$ and $I+i$ from the inverting input of these amplifiers. Herein i is the speech/metering current and I is a DC current having a value which will be given later.

LADC includes two voltage-to-current converters of which the first includes operational amplifier OA1 whose non-inverting input constitutes input terminal VRG to which the above mentioned reference voltage VRG is applied. The output of OA1 is connected to the gate electrode of NMOS transistor NM1 whose source electrode is directly connected to the inverting input of OA1 and through reference resistor R4 to VAG. To its drain electrode voltage VAUX is connected through the emitter-to-collector path of diode connected PNP transistor T1.

Because the current at the source electrode of NM1 is equal to VRG a current I1 equal to (VRG−VAG)/R4 flows through in R4, i.e. in the source electrode of this transistor and also in the drain electrode thereof since the gate current of NM1 is negligible. Thus the first converter accurately converts input reference voltage VRG into a constant output current I1. The second voltage-to-current converter is similar to the first one and includes operational amplifier OA2, an associated NMOS transistor NM2 and resistor R5 which has a value equal to that of R4 and of R2 and R3. This converter moreover includes a peak or envelope detector constituted by a series diode D1 and a parallel circuit C1, R6 connected between the cathode of D1 and VAG. When a metering signal MS is to be transmitted from the line circuit to the subscriber subset TSS, it is also applied to the like named non-inverting input MS of OA2. As a consequent thereof the envelope VE of this signal appears at the junction point of the source electrode of NM2 and of R5 through which then flows a metering signal dependent current I2 equal to (VE−VAG)/R5. The current I2 is also the drain current of NM2 because the gate current thereof is negligible. The total current I flowing in the collector of T1 is then equal to $$I = I1 + I2 = \frac{(VRG - VAG) + (VE - VAG)}{R4} = \frac{\Delta V}{R5}$$

and hence comprises a fixed part I1 and a metering signal dependent part I2 which is zero when no metering signal is applied to OA2.

The base of transistor T1 is coupled via terminal X to the impedance synthesis circuit described in the above mentioned Belgian patent so that the current I is reflected to this circuit. As already mentioned the currents I−i and I+i, wherein i is a speech/metering current, are withdrawn from the inverting inputs TAC and RAC of the line operational amplifiers LOA0 and LOA1 respectively. These currents therefore flow from the outputs TP and RG to TAC and RAC through the feedback resistors R2 and R3 of LOA0 and LOA1, as shown.

The supply voltage V+ is connected to VAG via the series connection of resistor R7, the collector-to-emitter path of NPN transistor T2 and two separate branches, the first of which includes the collector-to-emitter path of NPN transistor T4 and resistor R8 in series and the second of which comprises the drain-to-source path of NMOS transistor NM3 and resistor R9 in series. The values of the resistor R8 and R9 are equal and the same as those of R4 and R5. Resistor R7 has a value equal to twice that of R4 or R5. NPN transistor T2 forms with NPN transistor T3 a Darlington amplifier, the base of T3, T5 being connected to VAUX so that the voltage at the junction point JP1 of the above two branches can never be higher than VAUX−2 $V_{BE}$. This is done to protect NM3 whose gate electrode is connected to that of NM2 and the drain current of which is equal to I2 because its source resistor R9 has the same value as the source resistor R5 of NM2. The base of T4 is connected to VRG so that its emitter current I3 is equal to $$\frac{VRG - VAG - V_{BE}}{R8}$$

i.e. to $$I_1 - \frac{V_{BE}}{R8}$$

since R8=R4. As a consequence a current substantially equal to $$I_2 + I_3 = I_1 + I_2 - \frac{V_{BE}}{R8} = I - \frac{V_{BE}}{R8}$$

flows in the emitter branch of transistor T2 i.e. to JP1. When neglecting the voltage drop in T2, T5 the voltage at the lower end Z of resistor R7 is therefore equal to $$(V+) - R7.I + V_{BE} \cdot \frac{R7}{R8}$$

or $$(V+) - 2\Delta V + 2V_{BE}$$

since $$\frac{R7}{R8} = 2 \text{ and } I = \frac{\Delta V}{R4} = \frac{2\Delta V}{R7}$$

The lower end Z of R7 is also connected to the bases of NPN transistors T5 and T7 which together with NPN transistors T6 and T8 respectively from Darlington amplifiers. V+ is connected to the commoned collectors of T5 and T6 via diode connected PMOS transistor PM1 which is connected in current mirror configuration with PMOS transistor PM2. The emitter of T6 is connected to VEET through resistor R10. The source electrode of PM2 is connected to V+ and its drain electrode is connected to V− via diode connected NMOS transistor NM4 whose gate electrode constitutes output terminal BR33 leading to the polarity reversal circuit BRC of FIG. 2. The commoned collectors of T7 and T8 are directly connected to V+ and the emitter of T8 is connected to the non-inverting inputs TDC of LOA0 and RDC of LOA1 via the series connection of resistors R11 and R12 and R13 and R14 respectively. The junction points VTI and VRI of R11 and R12 and of R13 and R14 are connected to output terminal BR22 and BR11 respectively which are also connected to the polarity reversal circuit BRC. The values of R11 and R13 are equal to that of R10. To be noted that the emitter of T8 also constitutes a control output terminal VX for a filter and feed circuit described in the Belgian Pat. No. 898 049 (L. BIENSTMAN-J. PIETERS 3-1)

The Darlington amplifiers T5, T6 and T7, T8 constitute buffers so that current can be drawn from V+ without substantially modifying the voltage at the lower end Z of R7.

Because the voltage at this end Z is equal to $$(V+) - 2\Delta V + 2 V_{BE}$$

whilst the voltage drop in the base-emitter junctions of T5 and T6 and of T7 and T8 is equal to 2 $V_{BE}$ the voltages at the upper end of R10 and at the emitter VX of T8 are each equal to $$VH'=(V+)-2\Delta V$$

Hence, the voltages at the ends of R10 are equal to VH' and VL'=VEET respectively, so that a current, say I4, flows therein, this current being reflected via PM1, PM2, NM4 in the polarity reversal circuit BRC connected to terminal BR33.

From the above it also follows that normally the voltage VH'=V+−2ΔV is present at the non-inverting inputs of LOA0 and LOA1 and that currents I−i and I+i are withdrawn from the inverting inputs of these amplifiers. As a consequent the DC voltage VH at the output of LOA0 and LOA1 is equal to VH=VH'+R2.I=VH'+R3.I=V+−ΔV because R2.I=R3.I=ΔV.

By means of the polarity reversal circuit BRC which will be described hereinafter the voltage VL'=VEET instead of VH' may be applied to either one or both of the non-inverting inputs of LOA0 and LOA1 and in this case DC voltage VL at the output of LOA0 or LOA1 is equal to
VL=VL'+R2.I=VL'+R3.I=VL'+ΔV In other words the output of each of LOA0 and LOA1 is either on VH or on VL and because VH is ΔV below V+ whereas VL is ΔV above VEET, the amplifiers LOA0 and LOA1 cannot be saturated by the metering signal MS which has an amplitude smaller than ΔV.

Figure 2:
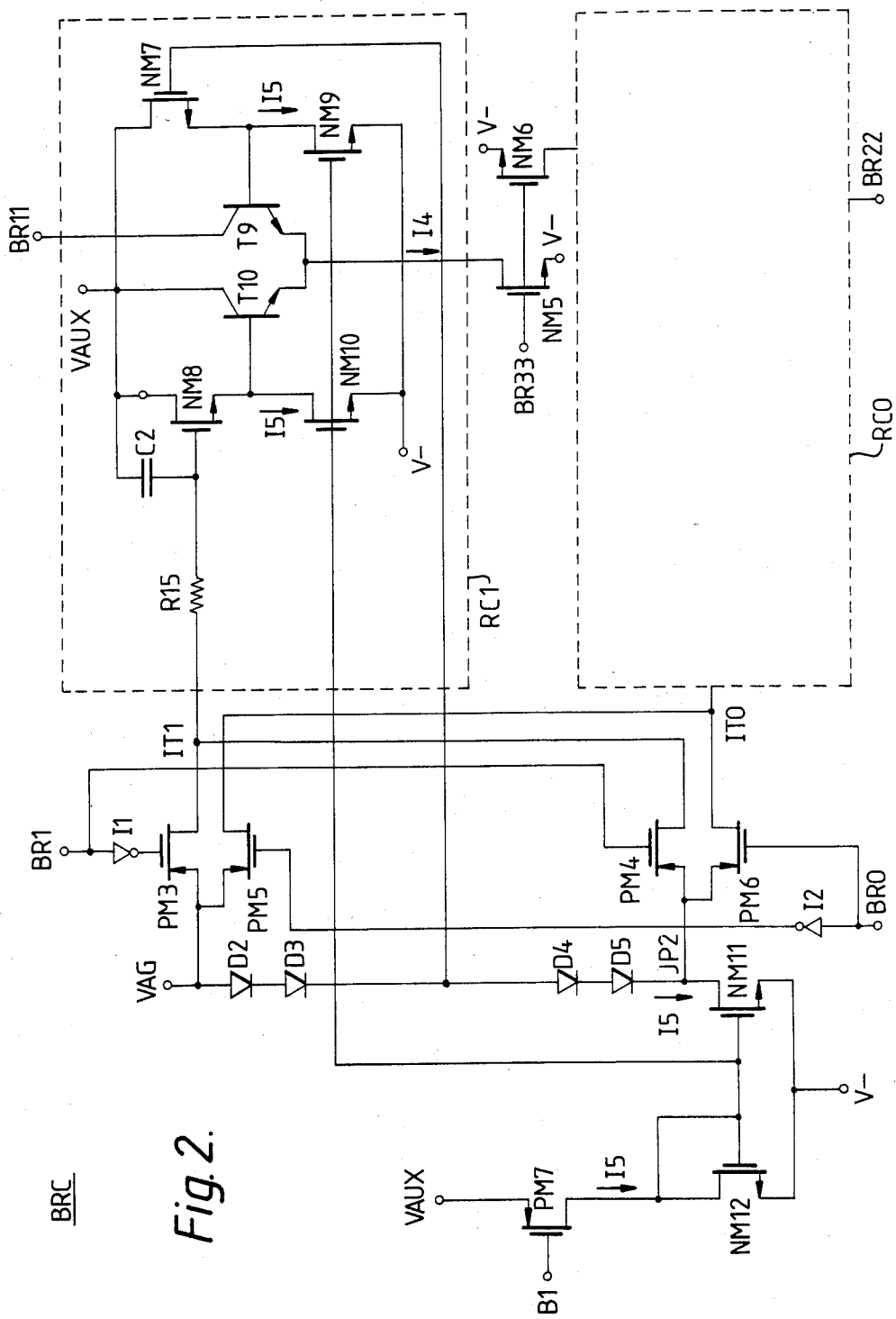
FIG. 2 shows a polarity reversal circuit according to the invention cooperating with the circuit of FIG. 1.

The polarity reversal circuit BRC which is represented in FIG. 2 is connected to the above terminals BR11, BR22 and BR33 of LADC. BRC has a common part and two individual reversal circuits RC0 and RC1 which are identical and of which only RC1 is shown in detail. RC0 and RC1 are each able to realize a so-called polarity reversal on LI1 and LI0 respectively. This means that either VH or VL can be connected to this line conductor LI1 or LI0. RC1 includes a differential amplifier comprising NPN transistors T9 and T10 whose collectors are connected to input terminal BR11 and VAUX respectively and whose emitters are commonly connected to V− via a constant current source constituted by NMOS transistor NM5 which is connected in current mirror configuration on the one hand with NM4 of LADC and on the other hand with NMOS transistor NM6 associated to RC0. The above mentioned current I4 therefore flows in the drain paths of these transistors NM5 and NM6. The base electrodes of T9 and T10 are connected to the source electrodes of respective NMOS transistors NM7 and NM8 whose drain electrodes are commoned to VAUX. In order to have a sufficient base current injected in T9 as well as in T10 the bases of these transistors are connected to V− via the drain-to-source paths of NMOS transistors NM9 and NM10 respectively, the gate electrodes of NM9 and NM10 being interconnected.

In the common part of BRC, VAG is connected to V− via diodes D2, D3, D4, D5 and the drain-to-source path of NMOS transistor NM11 in series, as well as to the gate electrode of NM8 via the series connection of the source-to-drain path of PMOS transistor PM3, input terminal IT1 of RC1 and resistor R15. The junction point of R15 and the gate electrode of NM8 is connected to VAUX via capacitor C2 which together with R15 constitutes an integration or delay circuit. C2 is isolated from T10 by NM8. The junction point JP2 of D5 and NM11 is connected to the above input terminal IT1 through the source-to-drain path of PMOS transistor PM4. In a similar way VAG and JP2 are connected to input terminal IT0 of RC0 via PMOS transistors PM5 and PM6 respectively. The gate electrodes of PM3 and PM4 are controlled from a same control terminal BR1 via inverter I1 and directly respectively, whilst the gate electrodes of PM5 and PM6 are controlled from a same control terminal BR0 through inverter I2 and directly respectively. The junction point of D3 and D4 is connected to the gate electrode of NM7 which isolates D2–D5 from T9 and the common gate electrodes of NM9 and NM10 are connected to that of NM11 and to that of diode connected NMOS transistor NM12 whose source electrode is connected to V−. VAUX is connected to the drain electrode of NM12 via the source-to-drain path of PMOS transistor PM7. The gate electrode of PM7 is biased by a voltage B1 such that it is continuously conductive and that a constant current, say I5, flows in the drain paths of PM7 and NM12. This current I5 is mirrored in the drain paths of NM9, NM10 and NM11. Control bits BR0 and BR1 may be applied to the above mentioned like named respective control terminals BR0 and BR1 to vary the voltage at TDC of LOA0 or at RDC of LOA1 between VH' and VL' or vice-versa in order to change the voltage at the output TP of LOA0 or at RG of LOA1 between VH and VL or vice-versa. This will be explained hereinafter.

Depending on BR1 being equal to 1 or 0 a voltage equal to VAG or VAG−4 VD is applied to the input terminal IT1 of RC1, VD being the voltage drop over any of the diodes D2 to D5. Similarly when BR0 is equal to 1 or 0 a voltage equal to VAG or VAG−4 VD is applied to the input terminal IT0 of RC0 respectively. Independent of the values of BR0 and BR1 a voltage VAG−2 VD is always directly applied to the gate electrode of NM7.

This means that when bit BR1 changes from 1 to 0 the voltage applied to the base of T10 varies from about VAG to about VAG−4 VD or vice-versa with a time constant determined by R15, C2. On the contrary, the base of T9 remains at a constant value about equal to VAG−2 VD. The same is true for RC0. In other words, the differential voltage applied to the differential amplifier T9, T10 may be varied between −2 VD to +2 VD, these voltages being such that either one of the transistors T9 and T10 is blocked (by VAG−4 VD), the other being then fully conductive (by VAG).

As a result the current in T9 drawn from BR11 varies from I4 to 0 or vice-versa when the control voltage at input terminal IT1 of RC1 varies from VAG−4 VD to VAG or vice-versa. As this current is drawn from the emitter terminal of T8 which is at the voltage VH' through resistor R11 which has the same value as R10, it is clear that the voltage at terminal BR11 and therefore the voltage applied to RDC of LOA1 then varies from VL' to VH' or vice-versa.

The same is true for terminal BR22 and terminal TDC of LOA0.

The above variation between VH' and VL' and therefore between VH and VL at TP or RG occurs in a gradual way without harmonic distortion as follows from pages 158 to 160 of the book "Analysis and design of analog integrated circuits" by R. P. Gray and R. G. Meyer, John Wiley and Sons, 1980. This is also described in the above mentioned Belgian Pat. No. 893 931 (B. F. ORR 1). The effect of the time constant determined by R15, C2 is to fix the time required for this change.

While the principles of the invention have been described above in connection with specific apparatus, it is to be clearly understood that this description is made only by way of example and not as a limitation on the scope of the invention.

We claim:

1. Telecommunication line circuit comprising at least one line amplifier whose output is coupled to a telecommunication line conductor, and DC biasing means associated with said amplifier to apply thereto a DC bias signal of such a value that said amplifier cannot saturate when an AC metering signal is applied to it, wherein said bias signal ($\Delta V$) is a bias voltage equal to the sum of a constant first voltage (VRG−VAG) and a variable second voltage (VE−VAG) varying with the envelope (VE) of said metering signal (MS), further comprising first (LOA0) and second (LOA1) operational line amplifiers whose outputs (TP, RG) are connected to respective conductors of said telecommunication line (LI0, LI1) and which are each fed between first (V+) and second (VEET) DC supply voltages, wherein said DC biasing means are able to apply such DC signals to inputs of said line amplifiers that a DC voltage appears on each of said line conductors which differs from said first (V+) or second (VEET) DC supply voltage by said DC bias voltage ($\Delta V$).

2. Telecommunication line circuit according to claim 1, further comprising first resistance (R2, R3) connecting outputs of said amplifiers to their inverting inputs, characterized in that said DC biasing means are adapted to apply a DC voltage equal to $VH'=(V+)-2\Delta V$ or VEET to non-inverting inputs of each of said amplifiers and to realize a voltage drop equal to said bias voltage in said first resistances so that said DC voltage appearing on said line conductor is equal to $VH=(V+)-\Delta V$ or $VL=VEET+\Delta V$, wherein $\Delta V$ is said bias voltage and V+ and VEET are said first and second DC supply voltages respectively.

3. Telecommunication line circuit according to claim 2, characterized in that said DC biasing means include first (OA1, NM1, R4) and second (OA2, NM2, R50) voltage-to-current converters, said first converter being adapted to convert said constant first voltage (VRG−VAG) into a constant first DC current (I1) and said second converter being associated to an envelope detector (D1, R6, C1) and being able to convert said metering signal (MS) into said variable second voltage (VE−VAG) and to convert said second voltage into a variable second DC current (I2), the sum of said first (I1) and second (I2) currents flowing in each of said first resistances (R2, R3) to realize therein said voltage drop ($\Delta V$).

4. Telecommunication line circuit according to claim 3, characterized in that said first converter is constituted by a third operational amplifier (OA1) to the non-inverting input of which the first sum voltage (VRG) of said first voltage (VRG−VAG) and a third voltage (VAG) is applied and whose output is connected to the gate electrode of a MOS first transistor (NM1) the drain-to-source path of which is connected in series with a said resistance (R4) between a fourth DC voltage (VAUX) and said third DC voltage (VAG) and the source electrode of which is connected to the inverting input of said third operational amplifier, and that said second converter is constituted by a fourth operational amplifier (OA2) to the non-inverting input of which said metering signal (MS) is applied and whose output is coupled via said envelope detector (D1, R6, C1) to the gate electrode of a MOS second transistor (NM2) the drain-to-source path of which is connected in series with a third resistance (R5) between said fourth and third DC voltages and the source electrode of which is connected to the inverting input of said fourth operational amplifier, the second sum voltage of said second (VE−VAG) and third (VAG) voltages appearing at said detector output and said first (R8, R4), second (R4) and third (R5) resistances having the same value.

5. Telecommunication line circuit according to claim 4, characterized in that said sum voltage (VRG) is also applied to the base of a third transistor (T4) whose emitter is connected to said third DC supply voltage (VAG) via a fourth resistance (R8), whilst said second sum voltage (VE) and said third voltage (VAG) is also applied to the gate electrode of a MOS fourth transistor (NM3) whose source electrode is connected to said fourth DC supply voltage (VAG) via a fifth resistance (R9), the collector-and-drain electrodes of said third (T4) and fourth (NM3) transistors being inter-connected (JP1) and coupled to said first supply voltage (V+) via a sixth resistance (R7) having a value equal to twice that of said fourth (R8) and fifth resistances (R9) which have the same value as said second (R4) and third (R5) resistances, and that said sixth resistance (R7) is coupled to the non-inverting inputs of said first (LOA0) and second (LOA1) amplifiers via a first Darlington amplifier (T7, T8) and respective seventh resistances (R11, R13) so that the values of the voltages at the outputs of said first Darlington pair are equal to VH'.

6. Telecommunication line circuit according to claim 5, characterized in that said sixth resistance (R7) is coupled to said second DC supply voltage (VEET) through a second Darlington amplifier (T5, T6) and an eighth resistance (R10) having a value equal to that of said seventh resistances (R11, R13) so that a predetermined current (I4) flows in said eighth resistance (R10).

7. Telecommunication line circuit according to claim 6, characterized in that the junction point of at least one of said seventh resistances (R11, R13) and the corresponding non-inverting input of said line amplifier (LOA0, LOA1) is connected to an output (BR22, BR11) of a polarity reversal circuit (RC0, RC1) which is adapted to gradually vary the current in said seventh resistance (R11, R13) between zero and said predetermined value (I4) in such a way that the voltage at said non-inverting input varies between said DC voltages VH and VL.

8. Polarity reversal circuit for reversing the polarity on at least one line conductor in a telecommunication line circuit, said polarity reversal circuit including a differential amplifier with first and second intercoupled amplifier circuits having a common bias and having first and second inputs and first and second outputs, and a control signal source which when applying said control signal between said inputs gradually varies the current on at least said first output between predetermined first and second values, characterized in that said first output (BR22, BR11) is connected on the one hand to a DC input voltage (VX=VH') via a first resistance (R11, R13) and on the other hand to an input of an operational amplifier (LOA0, LOA1), whilst said second output is connected to a DC supply voltage (VAUX), and that said common bias is provided by a constant current source (NM6).

9. Polarity reversal circuit according to claim 8, characterized in that said control signal source is able to apply between said amplifier inputs a differential voltage varying between $-2\,VD$ and $+2\,VD$, wherein VD corresponds to a diode voltage drop.

10. Polarity reversal circuit according to claim 8, characterized in that said control signal source includes the series connection between second (VAG) and third (V−) DC supply sources of two pairs (D2, D3; D4, D5) of series connected diodes and that said first mentioned DC supply voltage is coupled to the inputs of said first (T9) and second (T10) amplifier circuits via the drain-to-source path of a MOS first (NM7) and a MOS second (NM8) transistor respectively, the gate electrode of said MOS first transistor (NM7) being coupled to the junction point of said two pairs of diodes whilst the upper and lower ends of said series connected diodes are coupled to said gate electrode of said MOS second transistor (NM8) via individual switches (PM3, PM4) and a common delay circuit (R15, C2).

11. Polarity reversal circuit according to claim 10, characterized in that said amplifier inputs are also connected to said third DC supply source (V−) via respective MOS third (NM9) and fourth (NM10) transistors which are controlled from a common terminal.

* * * * *